United States Patent [19]
Takishima et al.

[11] 3,710,701
[45] Jan. 16, 1973

[54] FLASH DEVICE FOR A CAMERA AND A PHOTOGRAPHING SYSTEM WITH AN ARTIFICIAL ILLUMINATOR

[75] Inventors: Yoshiyuki Takishima; Yukio Mashimo, both of Tokyo, Japan

[73] Assignee: Canon Kabushiki Kaisha, Tokyo, Japan

[22] Filed: Dec. 21, 1970

[21] Appl. No.: 100,286

[30] Foreign Application Priority Data

| Dec. 27, 1969 | Japan | 45/789 |
| Dec. 27, 1969 | Japan | 45/790 |
| Jan. 19, 1970 | Japan | 45/4932 |
| Jan. 19, 1970 | Japan | 45/4933 |
| March 6, 1970 | Japan | 45/19583 |
| May 15, 1970 | Japan | 45/41955 |
| May 18, 1970 | Japan | 45/42693 |
| June 1, 1970 | Japan | 45/47330 |
| Jan. 22, 1970 | Japan | 45/6672 |
| May 19, 1970 | Japan | 45/49007 |
| May 22, 1970 | Japan | 45/50369 |
| May 30, 1970 | Japan | 45/53140 |
| June 1, 1970 | Japan | 45/54129 |
| June 12, 1970 | Japan | 45/58284 |
| Oct. 2, 1970 | Japan | 45/86940 |
| Aug. 24, 1970 | Japan | 45/84658 |
| Oct. 2, 1970 | Japan | 45/98262 |

[52] U.S. Cl. ..................... 95/11.5, 95/45, 315/227
[51] Int. Cl. .................................................. G03b 9/70
[58] Field of Search ............ 95/11, 11.5, 45; 315/227

[56] References Cited

UNITED STATES PATENTS

| 3,426,661 | 2/1969 | Wick et al. | 95/11.5 R |
| 3,418,904 | 12/1968 | Wick et al. | 95/11.5 R |

*Primary Examiner*—Samuel S. Matthews
*Assistant Examiner*—Richard A. Wintercorn
*Attorney*—Toren and McGeady

[57] ABSTRACT

In the flash device disclosed, the quantity of light emitted by a flash illuminator is varied on the basis of the time integration of a light intensity. A controller varies the operation of the illuminator on the basis of the distance between the camera and the scene being illuminated.

58 Claims, 37 Drawing Figures

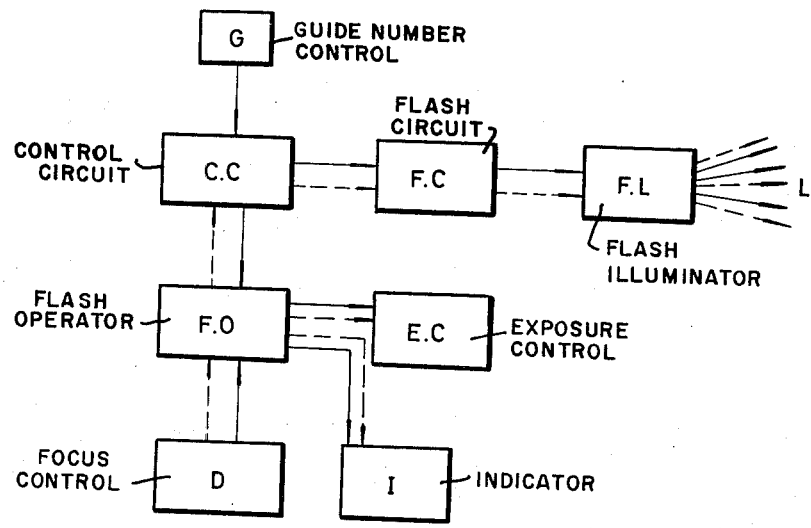
FIG.1
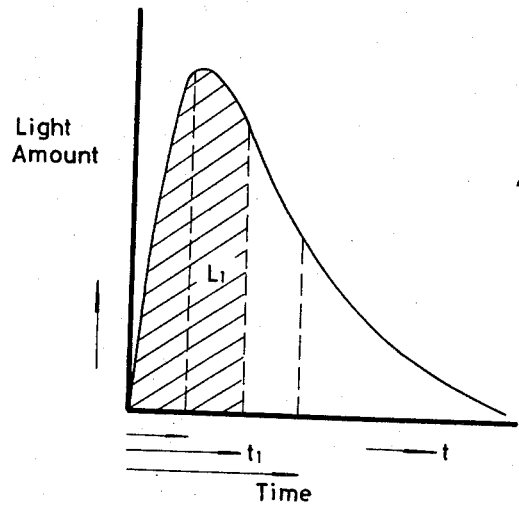
FIG.1-A
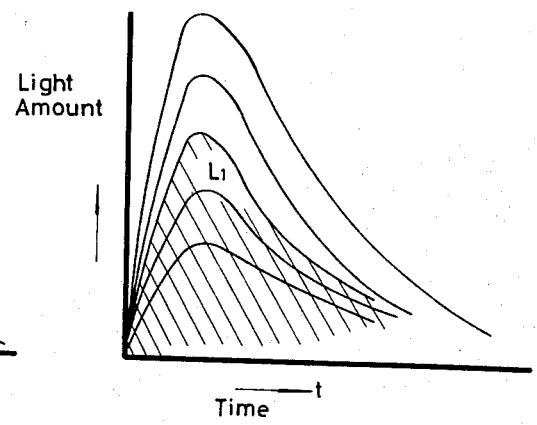
FIG.1-B

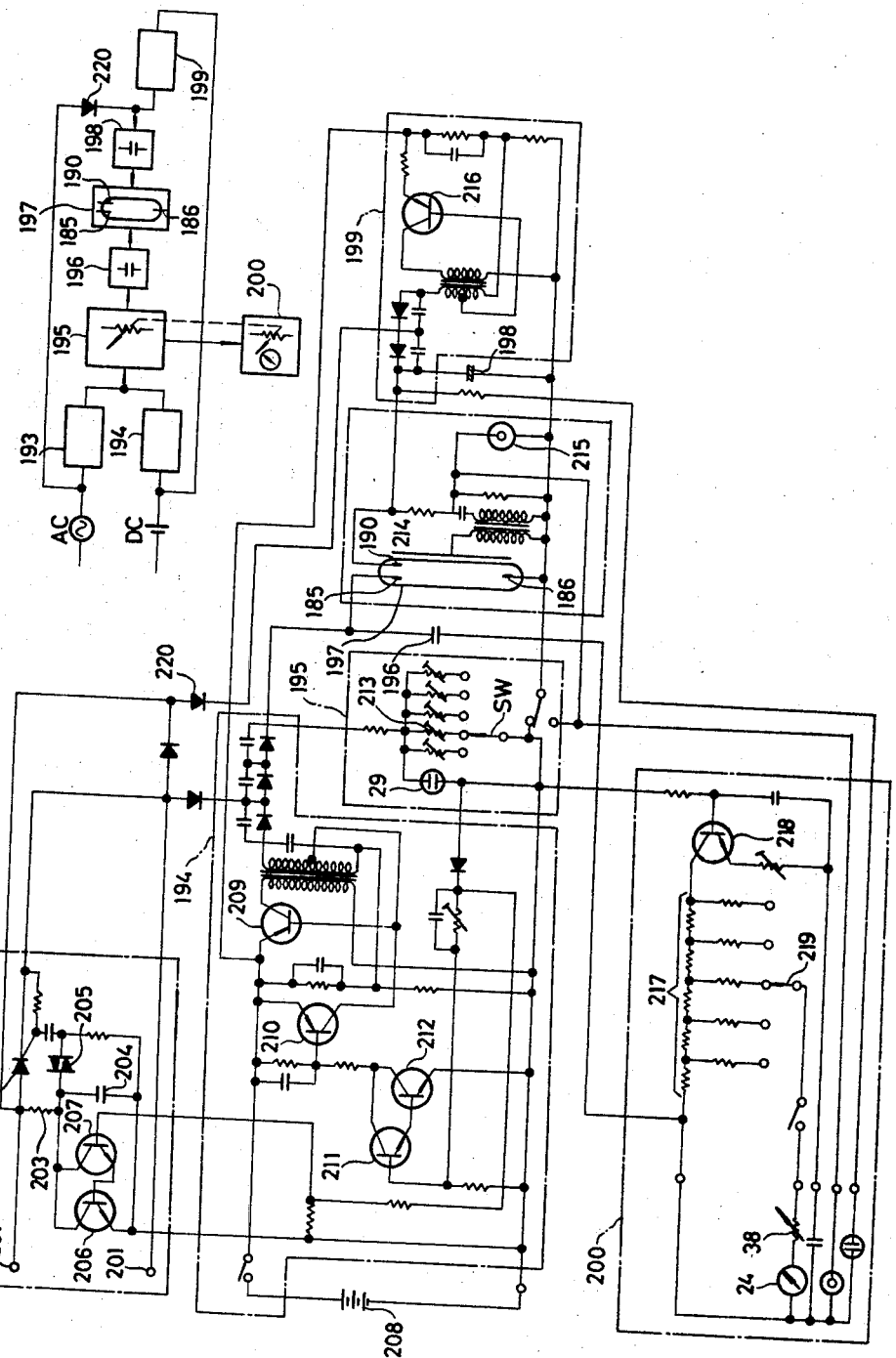

FLASH DEVICE FOR A CAMERA AND A PHOTOGRAPHING SYSTEM WITH AN ARTIFICIAL ILLUMINATOR

This invention relates to a flash device for a camera and particularly to a photographic system using artificial illumination having means for controlling the quantity of light emitted.

Conventional cameras can use the flash system disclosed in U. S. Pat. No. 3,033,988. Such a system is suitable for most applications of flash photography. However, conventional cameras do not require adaptation of the flash system to complicated photographic operations.

It is desirable to use flash devices whose light output is controlled with cameras having electronic exposure controls.

A main object of the present invention is to provide a flash device and a photographing system to which a high degree of technics of photographing can be applied.

Another object of the present invention lie in a flash device for a camera and a photographing system with an artificial illuminator comprising a controller for the control of a light amount irradiated from the artificial illuminator as a time integration of a light intensity and irradiated in accordance with the operation of an operator for the controller in a manner that the light amount corresponds at least to an illumination distance.

Other objects and features of the present invention lie in provision of a gaseous discharge tube of tri-electrodes or the like as the illuminator and lie in provision of a gaseous discharge tube as the illuminator in combination with a quenching discharge tube for termination of illumination from the gaseous discharge tube.

The present invention is advantageous for an automatic focus control of a camera with an illuminator provided thereon.

Still other objects and features as well as advantages of the present invention will be understood from the following descriptions in reference with the attached drawings.

FIG. 1 is a block diagram for illustrating the present invention.

FIG. 1-A and FIG. 1-B are graphs showing the relation between light intensity and illumination time to attain a controlled amount of light illumination from an illuminator.

FIG. 34 shows a block diagram of a sixteenth embodiment of the speed light device and the photographing system according to the present invention.

FIG. 35 is a schematic diagram illustrating another embodiment of the invention.

Figure 2:
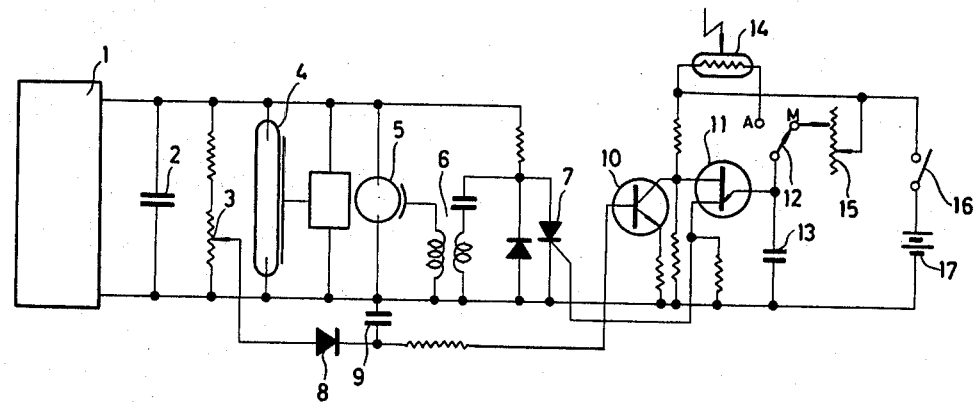
FIG. 2 shows a circuit diagram of a first embodiment of a speed light device with an illuminating discharge tube and a quenching discharge tube according to the present invention.

Referring to FIG. 1, D is a focus or distance control, C.C. is a control circuit for a flash circuit F.C., and F.L. is a flash illuminator. L is light from the illuminator F.L., G is a guide number control for the control circuit C.C., F.O. is a flash operator, E.C. is an exposure controller and I is an indicating means. Functional description will be made on the signal flow shown by the dotted line in FIG. 1.

When the focus control D is set for the distance to the object to be photographed, the control circuit C.C. is adjusted directly or through the flash operator F.O. to control the light L from the illuminator F.L..

Upon signal flow through the flash operator F.O., the exposure control E.C. is controlled by the flash operator F.O., and the indicator I displays its indication.

Next, functional description will be made on the signal flow shown by the solid line in FIG. 1.

The guide number control G set the control circuit C.C. to control the flash circuit F.C. to produce a controlled amount of light L from the illuminator F.L.

The flash operator F.O. receives a control signal from the control circuit C.C. and a distance signal from the focus control D to effect appropriate operation of the exposure control E.C. as well as to effect an indication of the indicator I.

The control of light amount may be effected as shown in FIG. 1-A or FIG. 1-B.

In FIG. 1-A, $L_1$ shows an appropriate amount of light L from the illuminator F.L., $t_1$ shows the time for obtaining the appropriate amount of light $L_1$. In this case power supply to the illuminator is preferably constant. In order to produce the appropriate light amount $L_1$, the illuminator should be prevented from illuminating beyond the time $t$ by the disconnecting of the power supply to the illuminator or by the termination of illumination of the illuminator.

In case of FIG. 1-B, the power supply to the illuminator is controlled for example by changing the voltage supplied to the illuminator to deliver the appropriate light amount $L_1$ of the light L.

The first embodiment of the present invention refers to a speed light device used for flash photography which controls the amount of light on the basis of photographing informations.

There exist speed light devices in which the charging voltage across a main capacitor is detected and the diaphragm mechanism of a camera is controlled with it. In others the residual charge across a main capacitor is discharged, by being short-circuited by a by-pass discharge tube as soon as a proper exposure value is reached, while the light reflected from the object is integrated so that the lighting up of a gaseous discharge tube ceases half way.

In the latter case, the proper exposure value can not always be obtained on the basis of the state of object to be photographed. Further the light amount by the speed light device being limited, the range of shooting distance in which a photograph can be taken is disadvantageously limited in case when the diaphragm is pre-chosen to a certain desired value. It is all the more disadvantageous that the above-mentioned limited range can not be confirmed in advance.

The first embodiment of the present invention involves a speed light device which is rendered free from the beforementioned weak points of the conventional speed light device with automatic light control, by setting the time of the discharge of residual charge through a by-pass discharge tube in advance in accordance with photographic information, such as shooting distance. The terminal voltage across the main capacitor is fed back to the light quantity control circuit in such a manner that the time of discharge by the by-pass discharge tube is adjusted. In order to compensate for the increase or decrease of the pre-set light quantity, the light quantity corresponding to guide number of the photoflash discharge tube is influenced by the charge loaded in the main capacitor.

FIG. 2 shows a circuit diagram of the first embodiment of the speed light device according to the present invention.

In FIG. 2, 1 is an electric source for a speed light device, 2 is a main capacitor, 3 is a variable resistor to detect the voltage charged across the main capacitor 2, 4 is a gas discharge tube with its trigger circuit, 5 is a by-pass discharge tube, 6 is a trigger circuit of the by-pass discharge tube 5, 7 is a silicon controlled rectifier, 8 is a diode, 9 is a condenser composing a stabilizing circuit of the feed back circuit together with the diode 8, 10 is a detector transistor of the feed back circuit, 11 is a double base diode, 12 is a change-over switch for an automatic control or a manuel control, 13 is a timer condensor determining the time constant of the termination of the by-pass tube 5, 14 is a photoelectric element of CdS, 15 is a variable resistor for photographing informations such as shooting distance sensibility of film, diaphragm value, 16 is a main switch, and 17 is a battery.

Below the operation of the device shown in FIG. 2 is explained in detail.

When the change-over switch 12 is switched over to the terminal A, the resistance value of the photoelectric element 14 is determined by the light reflected from the object to be photographed, and the light amount control circuit works with the time constant determined by the above resistance value and the capacitance value of the timer condensor 13 so that the lighting up of the gas discharge tube 4 is ended half-way through its normal cycle by means of the by-pass discharge tube 5. So far this represents the operation of the speed light device with the automatic light control.

When the change-over switch 12 is switched over to the terminal M, the flash photography information such as the sensitivity of film, diaphragm value, shooting distance etc. are set by the variable resistor 15. When the trigger circuit of the gas discharge tube is actuated for example by the shutter release, the discharge tube 4 lights up. When the switch of the electric source 7 is closed synchronously, the double base diode 11 permits the flow of electric current therethrough after the delay in time caused by the time constant circuit consisting of the pre-set resistor 15 and of the timer condensor 13, and the silicon controlled rectifier 7 is turned on to permit the flow of electric current by the output from the double base diode.

Thus a pulse is generated by the trigger circuit 6 of the by-pass discharge tube 5, and the by-pass discharge-tube 5 is short-circuited to discharge the residual charge across the main capacitor 2. Therefore, the photoflash discharge tube 4 stops lighting up half-way through its normal cycle so that the proper exposure is obtained.

According to the embodiment shown in FIG. 2, in order to compensate the change of the guide number of the photoflash discharge tube 4 due to a charged state of the main capacitor 2, the terminal voltage across the main capacitor 2 is detected by the variable resistor 3 to feed back its output through the stabilizing circuit composed of the diode 8 and the condensor 9 to the base of the transistor 10. The out-put from the transistor 10 controls the bias time of the double-base diode in such a manner as to control the time to stop the light up of the discharge tube 4 by means of the by-pass discharge tube. In consequence the bias time to stop the light up becomes shorter than that determined only by the resistor 15 and the timer condensor 13 because the bias to the double base diode 11 becomes lower when the voltage across the main capacitor 2 is higher. On the other hand the time to stop the lightening up is delayed, when the voltage across the main capacitor is low. In this manner that the light amount is adjusted.

Figure 3:
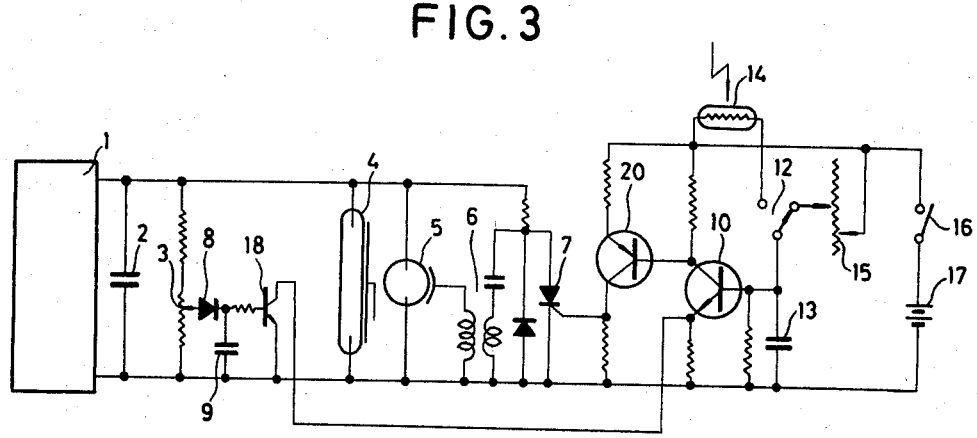
FIG. 3 shows a circuit diagram of a modification of the embodiment shown in FIG. 2.

FIG. 3 shows a circuit diagram of a modification of the first embodiment of the speed light device according to the present invention. In FIGS. 2 and 3 like references numerals designate like parts. In FIG. 3, a detector transistor 18 responds to the detecting circuit for sensing the voltage across the main capacitor 2. Transistors 19 and 20 form part of the light quantity control circuit. The voltage across the main capacitor 2 is detected through the diode 8 by the transistor 18, with whose out-put the bias of the transistor 19 is controlled. The time at which the transistors 19 and 20 permit the flow of electric current with the time constant determined by the value of the resistance of the photoelectric element 14 or of the variable resistor 15 for setting the photographic information is adjusted with the out-put of the transistor 18 of the detecting circuit. The silicon controlled rectifier is turned on similarly.

As above-mentioned in case of the first embodiment of the speed light device, the by-pass discharge tube 4 is let to work with the photographing informations for flash photography in such a manner that the lightening up of the photoflash discharge tube 4 ceases half-way, whereby the speed light device provides a circuit for adjusting the change of the light amount depending upon the charged state of the main capacitor 2, so that in case of flash photography any desired diaphragm value can be chosen while the exposure obtained in this way can be made remarkably correct so that a very effective and a convenient speed light device is constructed.

Figure 4:
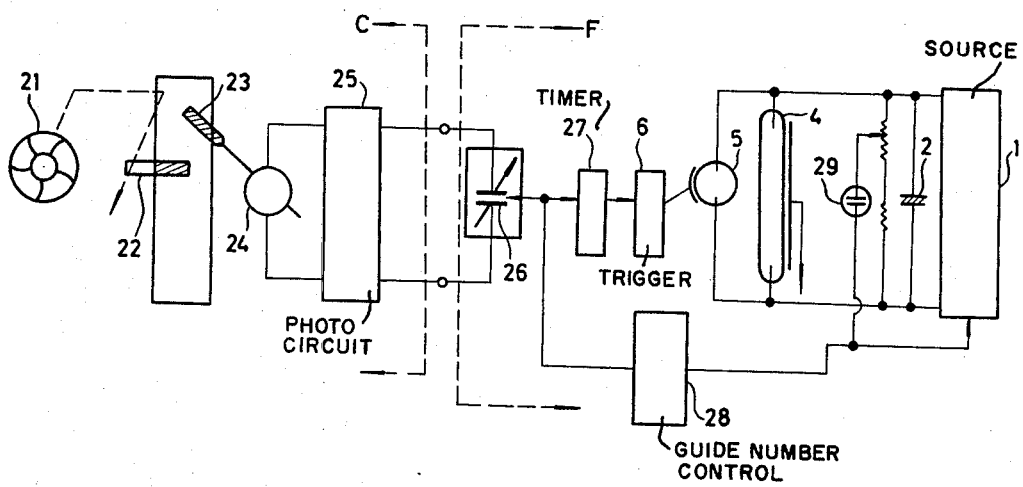
FIG. 4 shows a schematic block diagram of a second embodiment according to the present invention.
Figure 5:
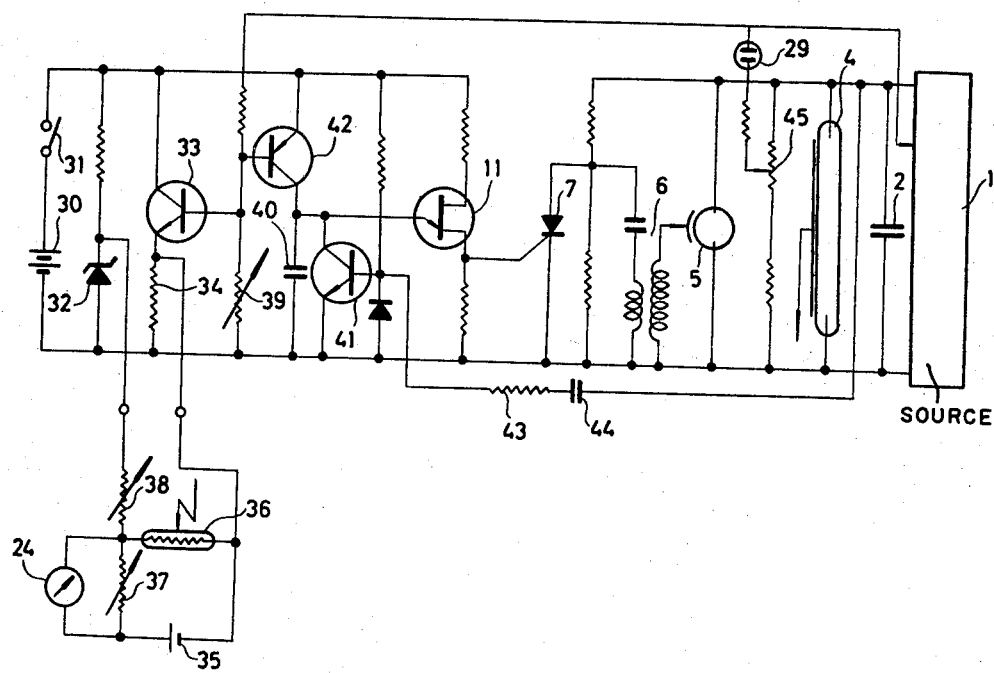
FIG. 5 shows a circuit construction of the second embodiment shown in FIG. 4.

Referring to the second embodiment shown in FIG. 4 and FIG. 5, C shows a camera provided with a photometric circuit 25, and F shows a flash device coupled with the camera C. The camera C comprises a diaphragm mechanism 21, a reference pointer 22 positioned in a view window provided for example in a camera finder and associated with the diaphragm mechanism 21, and an ammeter 24 with its pointer 23 connected to the photometric circuit 25. The photometric circuit 25 comprises a photo-conductor of CdS 36 and a variable resistor 37 for the photographing informations. 35 is a battery for the photometric circuit 25 and 38 is a variable resistor 23 for photographing informations.

While the flash device F comprises a variable power source 26 for the control of the photometric circuit 25 of the camera c. 27 is a timer circuit, 28 is a guide number controller, and 29 is a neon indicator tube. 30 is a power source for the timer circuit 27, 31 is a switch of the timer circuit 27, 32 is a zener diode, 33 is a detector transistor, and 34 is an emitter resistor of the transistor 33 to control the photometric circuit 25. 39 is a variable resistor for the guide number, 40 is a timer capacitor, 41 is a switching transistor as a timer starter switch, and 42 is a timer transistor. A resistor 43 and a condensor 44 in combination deliver the timer start signal to the switching transistor 41 when the trigger circuit of the gaseous discharge tube 4 is triggered and the discharge tube 4 starts its illumination. A variable resistor 45 contribute to compensate the time constant of the timer circuit 27 when the neon discharge tube 29 indicates an operational state of the flash device F.

According to the second embodiment, it is possible to obtain an appropriate exposure value under a desired diaphragm value or under a desirable guide member value by detecting and delivering the signal corresponding to the voltage across the main capacitor 2 to adjust the guide member adjuster 28 and by controlling the timer circuit 27 for the light amount control and the photometric circuit 25 of the camera in accordance with the detected signal.

The detected signal delivers a stop signal to the power source 1 to stop the power supply for charging the main capacitor 2 in case when the voltage across the main capacitor 2 reaches a certain operable level.

Figure 6:
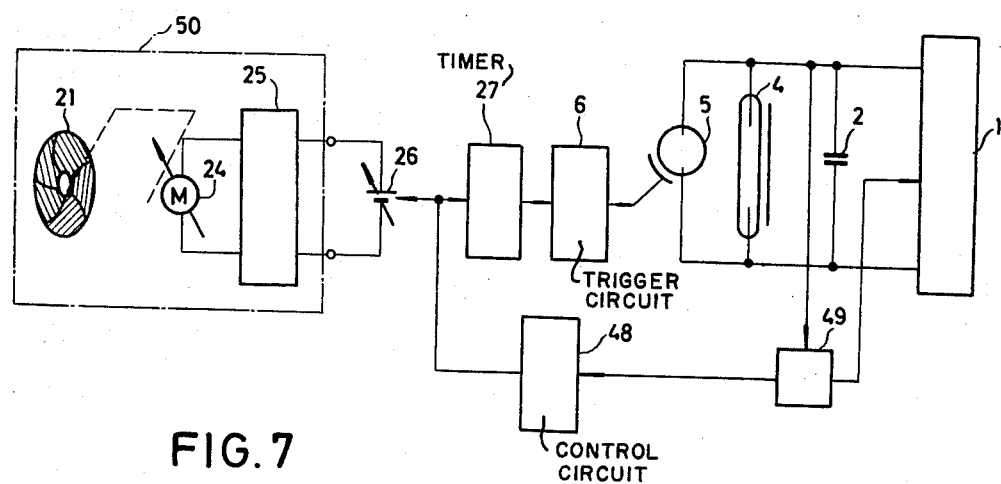
FIG. 6 shows a schematic block diagram of a third embodiment according to the present invention.
Figure 7:
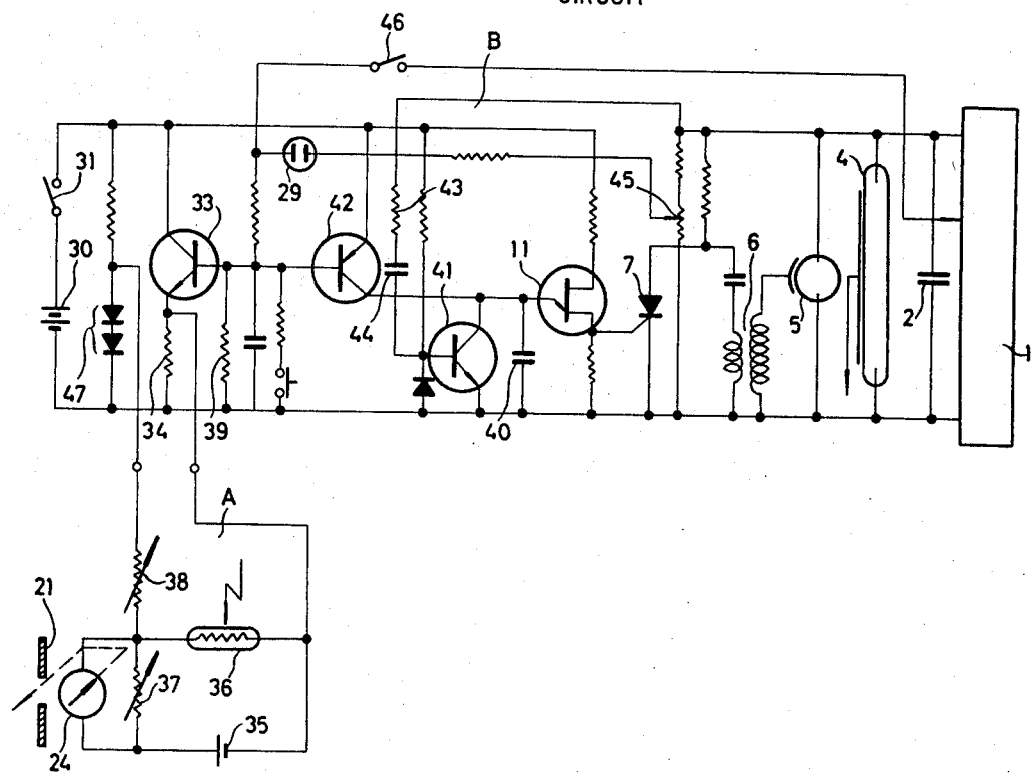
FIG. 7 shows a circuit construction of the third embodiment shown in FIG. 6.

Referring to the third embodiment shown in FIGS. 6 and 7, 46 is a super charger switch for permitting the power supply to the main capacitor 2 by its opening, 47 is a diode, and 48 is a controller circuit for the control of a camera 50 and for the control of the termination through the by-pass tube 5 of the discharge tube 4. 49 is a gate including the neon discharge tube 29 and the super charger switch 46.

In this embodiment, the diaphragm mechanism 21 is associated with the ammeter 24.

According to this embodiment, a functions are similar to those in case of the second embodiment, but the diaphragm mechanism 21 is controlled by the ammeter 24, and the super charger switch 46 permits the super charging across the main capacitor 2 by its opening.

Figure 8:
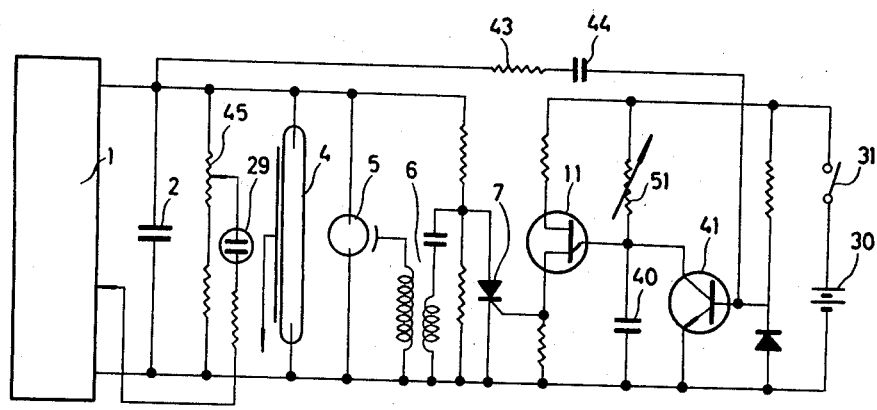
FIG. 8 shows a circuit construction of a fourth embodiment according to the present invention.
Figure 9:
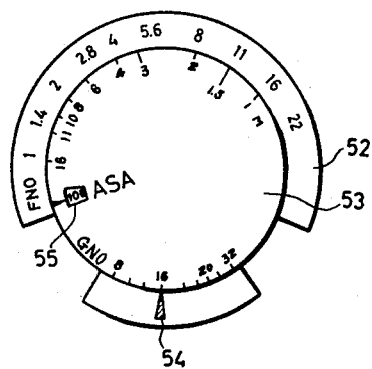
FIG. 9 shows schematically an operator mechanism which is applicable to the flash device or the photographing system according to the present invention.

In the fourth embodiment shown in FIG. 8 and FIG. 9, a variable resistor 51 is adjusted according to the calculated indication of a calculator (shown in FIG. 9) for adjusting the amount of light in correspondence to the values input to the calculator. The calculator comprises a ring 52 for diaphragm adjustment which is fixed to a reference member 54 with a reference mark, a disc 53 for shooting distance adjustment and guide number indication. The disc 53 is provided with a view window 55 for film sensitivity. The film sensitivity scale is fixed to the flash device, and when the disc 53 is rotated at a position where a scale reading for the sensitivity of the film used is viewed through the window 55. Next the ring 52 with reference member 54 is rotated to coincide the shooting distance reading with the diaphragm value settled to the camera for obtaining a guide member reading for an appropriate photographing.

The first to fourth embodiments described hereinbefore are common in that the quenching tube functions as a by-pass element for the termination of the main capacitor and the main discharge tube of dielectrode type.

Figure 10:
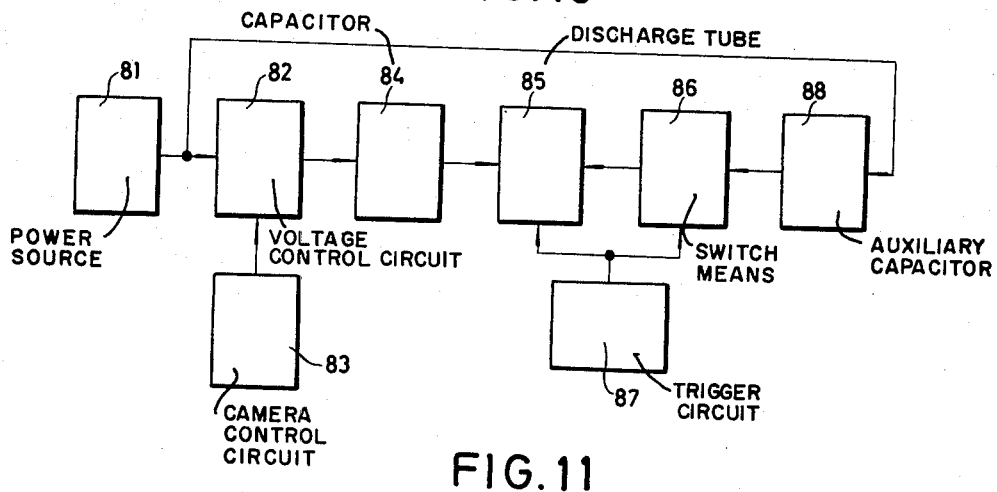
FIG. 10 shows a schematic block diagram of a fifth embodiment according to the present invention.
Figure 11:
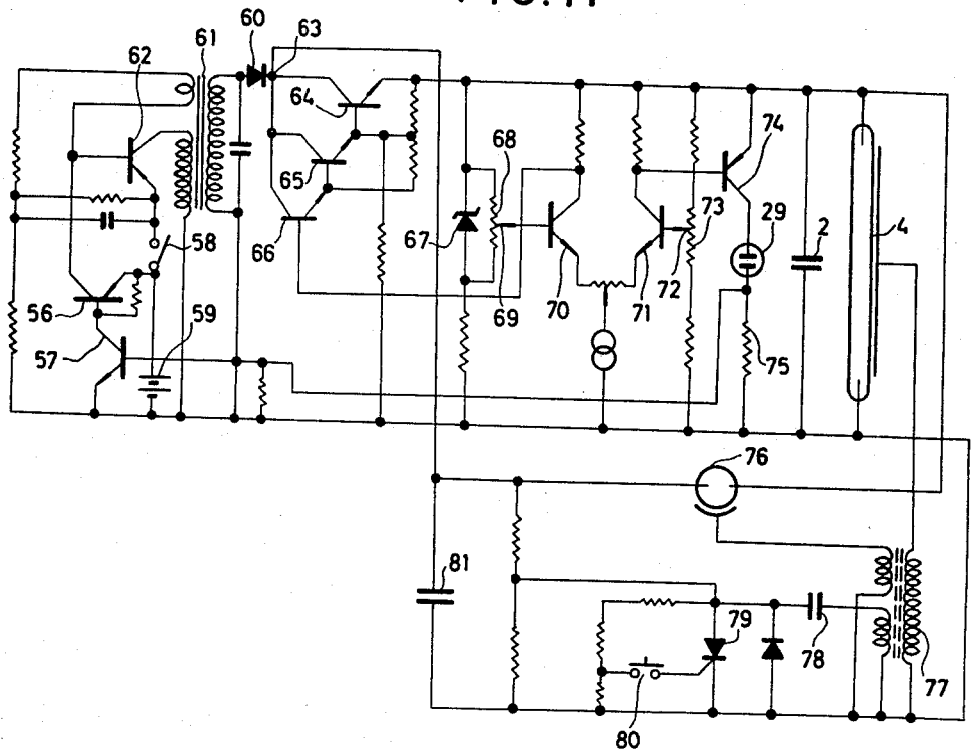
FIG. 11 shows a circuit construction of the fifth embodiment shown in FIG. 10.

However, in the fifth embodiment shown in FIGS. 10 and 11, a quenching tube 76 is provided for ignition of the discharge tube 4 with the aid of an auxiliary capacitor 81.

With the provision of the quenching tube 76 and auxiliary capacitor 81, the discharge tube 4 becomes operable in a wide range of its light out-put.

In FIG. 10, 81 is a power source for the device, 82 is a voltage control circuit, 83 is a camera control circuit, 84 is a current source such as a main capacitor, 85 is a discharge tube, 86 is a switching means of a quenching tube, 87 is a trigger circuit both for the discharge tube 85 and the switching means 86, and 88 is a current source such as an auxiliary capacitor.

A direct current out-put of high voltage from the power source 81 is given to the main capacitor 84 through the voltage control circuit 82 to charge the main capacitor 84, while the direct current out-put of high voltage is directly given to the auxiliary capacitor 84 to charge itself. The voltage control circuit 82 comprises an adjustable element for setting a certain guide number corresponding to the photographing informations, and the voltage control circuit is controlled by the pre-set of the adjustable element to effect changes in its charging voltage for the main capacitor 84.

When the main capacitor 84 and the auxiliary capacitor 88 are charged up, the terminal voltage across the capacitor 88 becomes equal to the out-put voltage from the power source 81. After the completion of charging of the both capacitors 84 and 88 from the power source 81, when the trigger circuit 87 is triggered with the aid of a synchronizer of a camera, the discharge tube 85 and the switching means 86 are simultaneously triggered by the trigger pulse from the trigger circuit 87. This trigger pulse inverts the switching means 86 in a short-circuited state and the charge across the auxiliary capacitor 86 is ready to discharge across the discharge tube 85. While synchronously the trigger pulse is given to the discharge tube 85 to permit the excitation of the illumination by high voltage of the auxiliary capacitor 88. Thus the charge ready to discharge contributes to excite the illumination of the discharge tube 85. By the excited illumination, the impedance of the discharge tube 85 is lowered, and the charges across the main capacitor is permitted to contribute for a successive illumination of the discharge tube.

In this way, even when the terminal voltage across the main capacitor 84 is lower than the voltage for illumination of the discharge tube 85. The illumination is brought and maintained as the illumination is excited by the high voltage from the auxiliary capacitor 88. Therefore, the guide number of the speed light device is changed as desired by adjusting in a wide range the charged voltage across the main capacitor 84 from the voltage control circuit 82.

In FIG. 11, 62 is an oscillator transistor, 56 and 57 are transistors constituting an oscillation control circuit, 61 is a transformer both for oscillation and step-up action of the voltage, 58 is a power switch for a battery 59, and 60 is a rectifier. These parts constitute a transisterized power source.

64 to 66 are transistors for the voltage control circuit 82, 67 is a Zener diode, 70 and 71 are transistors for a detector circuit of a differential amplifier construction, 68 and 73 are variable resistors for adjustment of the photographing informations such as guide numbers, and shooting distance respectively, 74 is a switching transistor for preventing an excessive charging, and 29 is a neon lamp, 75 is a load resistor for the detection of the excessive charging. These parts constitute a voltage control circuit.

77 to 80 constitute the trigger circuit 87 in which, 77 is a transformer, 78 is a condensor, 79 is a silicon controlled rectifier and 80 is a synchronizer. 76 is a by-pass tube as a switching means 86 and 81 is an auxiliary capacitor.

By the circuit shown in FIG. 11 the charge across the main capacitor is detected by detector differential amplifier with input terminals 69 and 72, and the detected signal controls the stoppage of the current flow through the transistor 64. The potential at a connecting point 63 is equal to the potential given to the discharge tube 4 for its excitation through the by-pass tube 76 triggered by the trigger circuit 87 of the parts 77 to 80.

Figure 12:
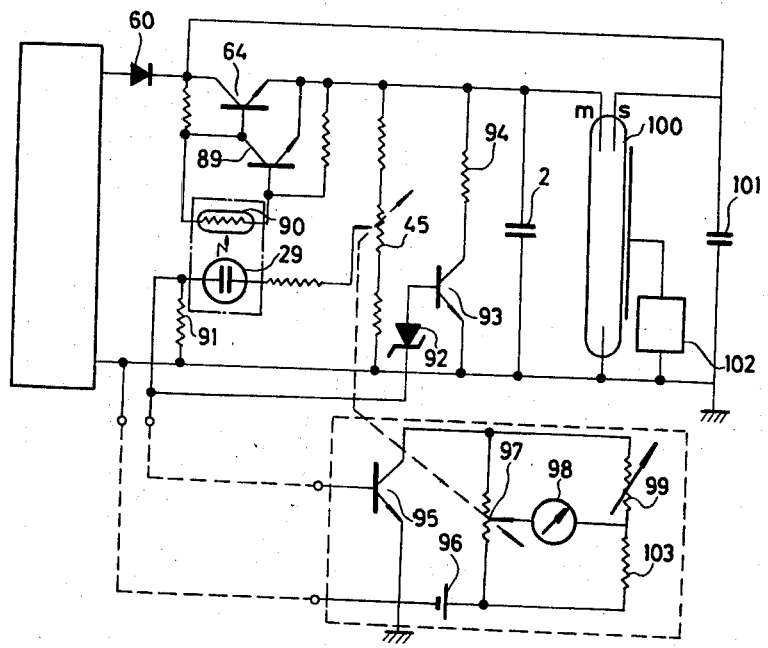
FIG. 12 shows a circuit diagram of a sixth embodiment of the speed light device according to the present invention.

The sixth embodiment shown in FIG. 12 refers to a speed light device for photoflash, whose light amount can be varied in a wide range. In case of taking a photograph using a conventional speed light device, it is impossible to choose any diaphragm value, because the guide number or light amount of the device is generally fixed and the diaphragm value depends exclusively upon the photographing distance. In order to obtain a certain desired diaphragm value by varying the light amount of speed light device, a controllor to set the diaphragm value of camera automatically corresponding to the guide number, functionally connecting the speed light device with the circuit of exposure meter is provided with the embodiments mentioned above. On the other hand, the method to change the guide number at the speed light side is that the capacity of the main capacitor is switched over in such a manner that the charge to be charged across the capacitor and therefor the light amount is changed. Another method is that the voltage for charging the capacitor is changed, whereby, however, the lightening up range of photoflash discharge tube is limited so that the light amount can only be controlled within a very narrow range, which is quite disadvantageous.

The sixth embodiment offers a speed light device in which the voltage for charging the main capacitor is controlled in order to obtain a desired light amount. With this embodiment the photoflash discharge tube can always be lighted up even if the terminal voltage across the main capacitor varies in a considerably wide range in such a manner that a speed light device whose guide number is varied in a wide range is easily realized.

Below the sixth embodiment is explained in details according to FIG. 12. In FIG. 12, 1 is a high voltage power source for speed light device such as a direct current to a direct current converting circuit including a transistor oscillation circuit. 60 is a resistor of a diode, 64 and 89 respectively a transistor composing a stoppage circuit for controlling and charging supplied voltage across the main capacitor 2, 90 is a photoelectric element composing a photocoupler together with a neon lamp 29. 91 is a resistor, 45 the variable resistor for adjusting charged voltage across the main capacitor 2, 94 a resistor for a by-pass discharging circuit, 93 a switching transistor for the discharging circuit, 92 a Zener diode. Parts enclosed by a dotted line is provided in a camera, whereby 95 is a switching transistor, 96 is a battery for an exposure meter circuit, 97, 99 and 103 respectively a resistor composing a bridge circuit, to which photographing informations are given. 98 is an ammeter, which is provided to set a diaphragm value. 100 is a photoflash discharge tube of triode type provided with an auxiliary electrode S, 101 an auxiliary capacitor, 102 a trigger circuit. Below the operation of the present sixth embodiment is explained. On the variable resistor 97 and 98 of the exposure meter circuit of camera the sensibility of film, photographing distance and guide number of the speed light device are set in advance. The resistor 97 of the camera is functionally connected with the variable resistor 45 by some means. In this way the guide number of the speed light device is set on the resistor 45. When the electric source 1 for the speed light device is switched on (not shown in the drawing) in this state, the high voltage power source 1 directly charges the auxiliary capacitor 101 through the rectifier 60. While the main capacitor 2 is charged through the control transistor 64. As soon as the terminal voltage across the main capacitor 2 reaches a value corresponding to a desired guide number, the neon lamp 29 lights up and with its light the resistance of the photoelectric element 90 decreases. Then the transistor 89 permits the flow of electric current therethrough and the base and the emitter of the control transistor 64 is terminated in such a manner that the stoppage transistor 64 is switched off and the charging across the main capacitor ceases. At the same time the switching transistor 95 at camera side is switched on make the bridge circuit ready for its actuation. In the exposure meter circuit the distance, sensibility of film and guide number are set in advance so that a proper diaphragm value is determined by the deflection of the pointer of the current meter 98. When in this state by means of the shutter release the photoflash discharge tube 100 is triggered on with the trigger circuit 102, the charge loaded in the auxiliary capacitor 101 presenting a voltage high enough to make the photoflash discharge tube 100 light up is at first discharged from the auxiliary electrode S in such a manner that the photoflash discharge tube 100 becomes ready to light up and then the charge across the main capacitor 2 is discharged through a main electrode m to obtain a lightening up corresponding to the desired guide number.

When the guide number is changed from a higher value over to a certain desired lower one by adjusting the resistor 45 and 97, the electric current through the neon lamp 29 changes and the voltage drop at the resistor 91 which is connected in series with the neon lamp 29 decreases, whereby under the effect of the Zener diode 92 the transistor 93 comes to permit the flow of electric current and a part of the charges in the main capacitor 2 is compensatingly discharged through the resistor 94. Thus the terminal voltage across the main capacitor 2 decreases so as to obtain the desired guide number.

As mentioned above according to the present 6th embodiment, by applying a photoflash discharge tube provided with an auxiliary electrodes and an auxiliary capacitor 101 of small capacitance a speed light device of variable light amount in a wide range is easily realized, whereby the discharge tube 100 lights up even when the voltage across the main capacitor 2 is too low to make the photoflash discharge tube without the auxiliary electrode 3 light up. Further by means of the photocoupler and the discharging circuit for the prevention of the excessive charging, any desired guide number is always easily obtained, so that a device quite profitable for flash photography is realized, while the device is made all the more convenient, by connecting the guide number adjusting mechanism of speed light device functionally with the setting mechanism of the guide number or the like of the exposure meter circuit of camera.

Figure 13:
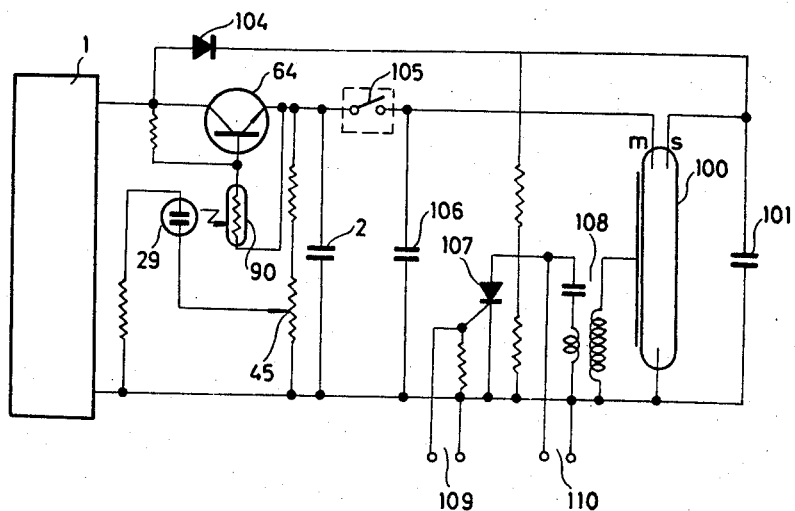
FIG. 13 shows a circuit diagram of a seventh embodiment of the speed light device according to the present invention.
Figure 14:
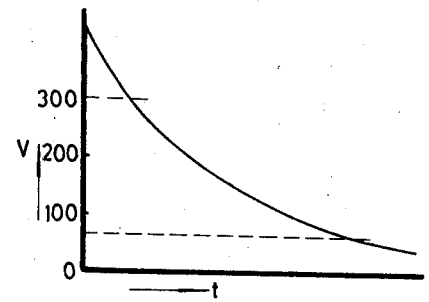
FIG. 14 is a graph showing the relation between the voltage across a main capacitor and the time.

The seventh embodiment shown in FIG. 13 is similar to the sixth embodiment shown in FIG. 12. Principal differences between the seventh and sixth embodiments are that the successive illumination in case of the sixth embodiment is intermittently given in case of the seventh embodiment.

Figure 15:
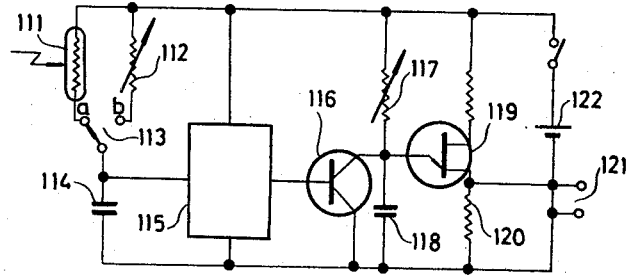
FIG. 15 shows a circuit construction of a part of the seventh embodiment with some modification.

In FIG. 13, 104 is a rectifier similar to the rectifier 60, 64 is a transistor, 109 is a starter for this embodiment, 110 is a synchronizer for a camera. 107 is a thyrister actuated by the starter 109, 108 is a trigger circuit for the discharge tube 100, 105 is a switching means which is intermittently opened or closed. By the switching means 105, the charge across the main capacitor 2 is shifted to a secondary capacitor 106. According to the seventh embodiment, a power source of large power becomes necessary and the device is simplified with a high efficiency. An auxiliary capacitor 101 is charged to a potential for excitation of the illumination through the rectifier 104. As the capacitance of the auxiliary capacitor 101 is 1/10 to several micro farads, the charging time is very short. Pulsive signals are given by the starter 109 to the gate of the thyrister 107 to cause intermittent illumination of the discharge tube 100 with the aid of the trigger circuit 108. While the charge across the main capacitor 2 is shifted intermittently and successively to the secondary capacitor 106 by the switching action of the switching means 105 which is controlled in a synchronized manner with the starter. During the decrease of the illumination, changes are given both to the secondary capacitor 106 and the auxiliary capacitor 101 for the next successive intermittent illumination. In this embodiment the number of the successive intermittent illuminations is controlled by the control of the starter 109. As the starter 109, the one shown in FIG. 15 is useful. As shown in FIG. 15, this embodiment is operable at an operating voltage higher than about 65V, while the conventional speed light device is not operable at a voltage under about 300V. In this way a long time illumination is possible with higher efficiency. The starter shown in FIG. 15 comprises a photosensitive element 111 and a variable resistor 112 for adjustment of the photographing informations. 113 is a change-over switch and 114 is a timer condensor, 115 is a trigger circuit for the timer,116 is a transistor controlled by the output of the trigger circuit 115. A variable resistor 117 and a condensor 118 determines the time-constant of an oscillator circuit having a double base diode 119. 120 is a load resistor, 122 is a battery for the starter 109, and 121 shows out-put terminals of the starter. This seventh embodiment is suitable for an illuminator provided in a camera for automatic focus control. In order to obtain intermittent illuminations, the circuit shown in FIG. 13 may be modified with a dielectrode discharge tube in place of the triode discharge tube. The switching means 105 may be composed of a silicon controlled rectifier in a similar manner as in case of the starter 109.

Figure 16:
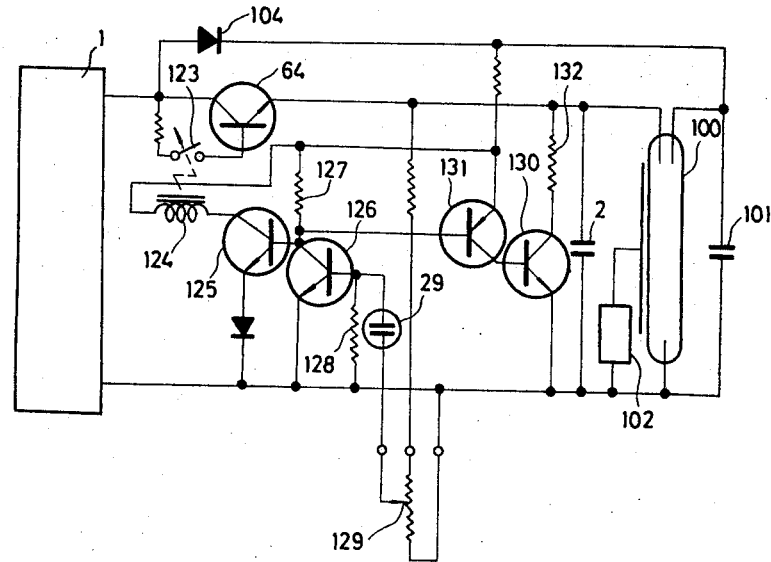
FIG. 16 shows a circuit diagram of an eighth embodiment of the photographing system according to the present invention.

The eighth embodiment shown in FIG. 16 makes it possible to obtain an appropriate exposure value automatically by controlling the charged voltage across the main capacitor in an associated manner with the camera setting mechanism of the photographing informations.

In FIG. 16, 123 is a switch controlled by an electromagnet 124. These parts 123 and 124 correspond to the photocoupler shown in FIG. 12. 125 and 126 are transistors for the detection and the control. Current through a load resistor 127 derives a transistor 131 to switch on a transistor 130. In case of excessive charging across the capacitor 2, current through a variable resistor 129 at camera side makes the transistor 126 conductive and the transistors 125 and 131 conductive to open the switch 123 and to form a discharge path of a resistor 132 and the transistor 130. 128 is a bias resistor. The variable resistor 129 is controls the guide number of the device.

Figure 17:
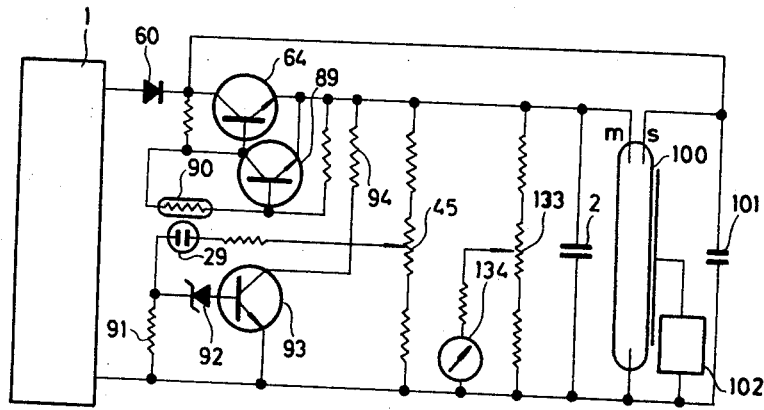
FIG. 17 shows a circuit diagram of a nineth embodiment of the flash device according to the present invention.
Figure 18:
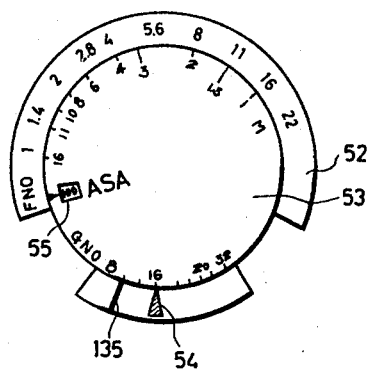
FIG. 18 shows schematically an operator mechanism similar to that shown in FIG. 9 but with some modification, which is applicable to the ninth embodiment shown in FIG. 17.

The nineth embodiment shown in FIG. 17 is a speed light device with a triode discharge tube 2 and its guide number indicator which is preferably coupled with a flash exposure calculator mechanism as shown in FIG. 18. The calculator mechanism shown in FIG. 18 is similar to the calculator shown in FIG. 9 except that the reference mark on the member 54 is rotated to coincide with the indication pointer for a certain combination of shooting distance and F number. In order to obtain an appropriate flash exposure, the potentio-meter 133 is associated with the member 54.

As shown in FIG. 17, an ammeter 134 is provided for the guide number indication with the aid of a potentiometer 133 for guide number adjustment.

Figure 19:
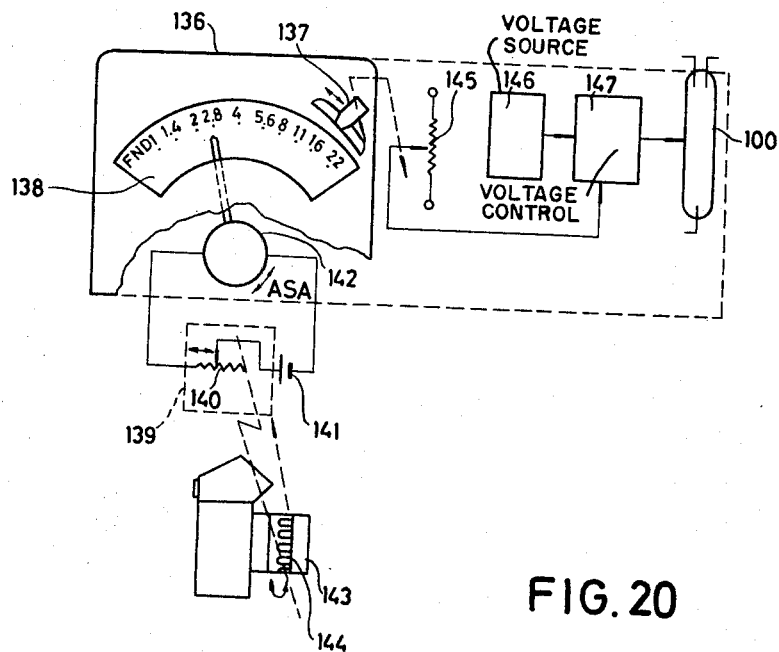
FIG. 19 shows a schematic block diagram of a tenth embodiment of the photographing system according to the present invention.

The embodiment shown in FIG. 19 is a modification of the embodiment shown in FIG. 18, in which 138 is a housing provided with an illuminator portion of a discharge triode 100, a high voltage source 146 and a voltage controller 147; and a flash operator portion of an ammeter 142 and its power source 141. The pointer of the ammeter 142 indicates F number on a scale plate 138. 139 is an adapter portion coupled with a photographing lens 143. In the adapter 139 a variable resistor 140 is provided and the variable resistor 100 is connectable in series with the battery 141 and the ammeter 140 when coupled with each other. The variable resistor 140 is adjusted by the rotation of a shooting distance ring 144. The deflection angle of the pointer of the ammeter 142 corresponds to the rotation angle of the shooting distance ring 144. The casing of the meter 142 is rotatably mounted to the housing 136 for the adjustment of film sensitivity. As the pointer is coaxial with its casing, the reference position of the pointer is adjusted according to film sensitivity.

The scale plate 138 is also coaxial with the pointer and the plate 138 is rotatable with an adjusting means 137. The adjusting means 137 changes resistance of the resistor 145 of the voltage control circuit in associated manner to control the amount of light from the discharge tube 100. Interconnection of the illuminator device with a camera and presetting of the film sensitivity after the interconnection of the adapter to the meter brings the system into a flash ready state.

This embodiment is useful for flash photographing by a high level of technics with excessive amount of light or a light amount slightly smaller than the appropriate amount. This embodiment is also useful for a day-time flash photographing. Although the embodiment shown in FIG. 19 comprises the triode 100, a diode type discharge tube 4 combined with a by-pass tube 5 also serves for the same purpose as the triode 100 as shown in FIG. 20.

Figure 20:
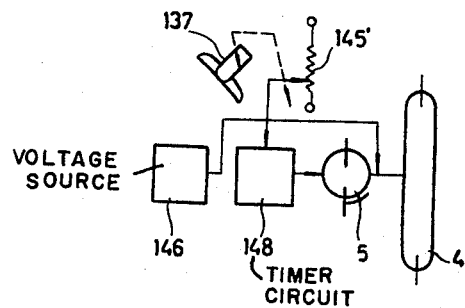
FIG. 20 shows a modification of the tenth embodiment in part.

In FIG. 20, 146 is a high voltage source, 148 is a timer circuit, 137 is an adjusting member, 145' is a variable resistor similar to the variable resistor 145.

Figure 21:
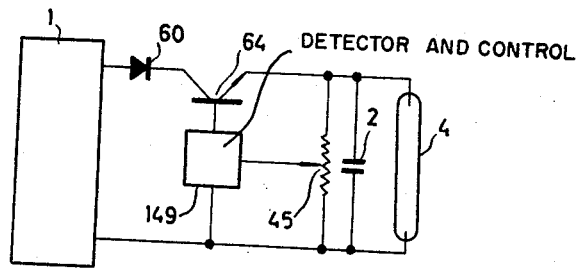
FIG. 21 shows a schematic diagram of an eleventh embodiment of the speed light device according to the present invention.
Figure 22:
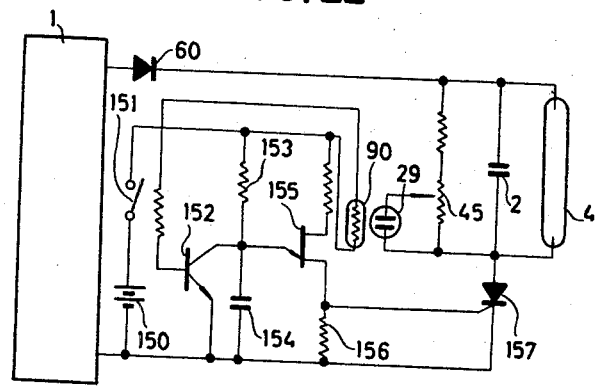
FIGS. 22 and 23 are circuit constructions respectively of the eleventh embodiment.
Figure 23:
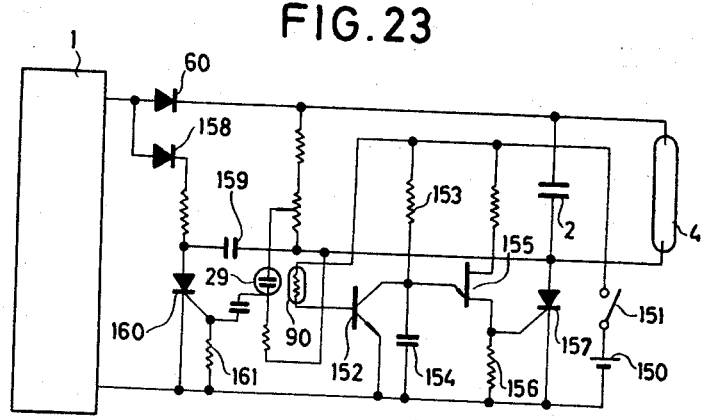

The eleventh embodiment shown schematically in FIG. 21 and illustratively in FIG. 22 and FIG. 23 is a speed-light device with the control circuit of a thyristor for controlling the charged voltage across the main capacitor 2.

In FIG. 21, 60 is a rectifier, 64 is a controller transistor, 45 is a detector resistor variable for guide number adjustment, 4 is a discharge tube of diode type with its trigger circuit not shown, 149 is a circuit for detection and for control. 1 is a high voltage.

In FIG. 22, 150 is a battery of the controller circuit which is actuated by a power switch 151, 152 is a switching transistor, 153 is an oscillator resistor, 154 is an oscillator condensor and 155 is an oscillation double base diode. The out-put of the oscillator through a load resistor 156 controls turning on and off of a thyristor 157. When the voltage across the main capacitor 2 reaches a certain value, the neon lamp 29 discharges and then the transistor 152 is brought conductive to decease an oscillation and thereby the thyristor is turned off for stoppage of charging across the capacitor 2.

This operation assures a constant amount of illumination corresponding to a desired guide number. Provision of the thyristor eliminates necessity of provision of a separate circuit for turning off the thyristor 157.

While in FIG. 23, a separate circuit for turning off the thyristor is provided to accommodate a high voltage source 1' of rather low inner impedance such as a piled battery. 158 is a rectifier diode, 159 is a shifting condensor, 160 is another thyristor, 161 is a bias resistor.

In this case, the charges across the shifting condensor 159 turns off the thyristor 157 as the inversion of polarity between the anode and the cathode of the thyristor 157 appears, even if the thyristor 157 is not turned off by the illumination of the input pulse as in case of provision of the filed battery 1' of low impedance.

The eleventh embodiment may be modified without provision of a photocoupler.

Figure 24:
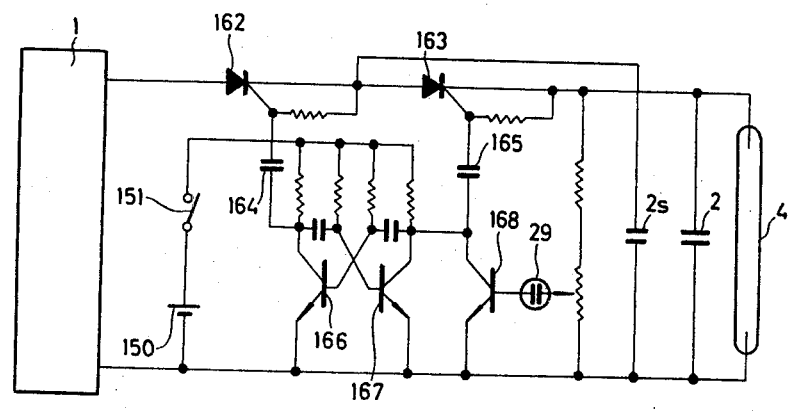
FIG. 24 shows a circuit diagram of a twelfth embodiment similar to the eleventh embodiment with some modification.

The twelfth embodiment shown in FIG. 24 is a speed light device whose charged voltage across the main capacitor 2 is given by an intermittent stepwise process of charging with use of a pair of thyristors 162 and 163 connected in series with each other and a sub-capacitor $2_s$.

In FIG. 24, 168 is a switching transistor, 166 and 167 are transistors constituting an astable multi-vibrator, 164 and 165 are coupling condensors, 150 is a battery of the controller circuit with a power switch 151. The out-puts of the astable multi-vibrator are given to respective gates of the thyristors 162 and 163 in an alternative manner for stepwise charging until a certain voltage across the main capacitor is obtained, and this is indicated by the neon tube 29.

Figure 25:
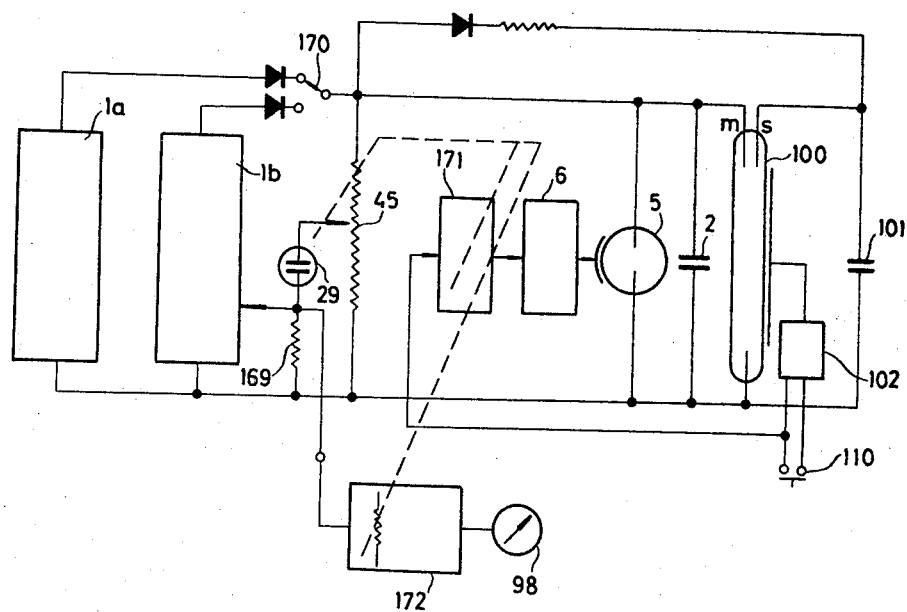
FIG. 25 shows a circuit diagram of a thirteenth embodiment of the photographing system according to the present invention.

The thirteenth embodiment shown in FIG. 25 aims to reduce power consumption of a battery, and shows a speed-light device and a photographing system provided both with a control circuit having a by-pass tube 5 and a control circuit having a triode discharge tube 100.

In FIG. 25, 1a is an AC power source or a piled battery, 1b is a stepped-up DC source, 169 is a bias-resistor, 170 is a change-over switch for the power sources, 171 is a timer circuit such as of Schmitt circuit construction for the control of the actuation of the by-pass tube 5, 110 is a synchronizer associated with shutter release of a camera, 172 is a photometric circuit with a variable resistor, and 98 is an indicator ammeter provided in the camera.

The potentio-meter 45, the variable resistor of the timer circuit 171 and the variable resistor of the photometric circuit 172 are adjusted in an associated manner with one other to widen further the operable range of the device.

Figure 26:
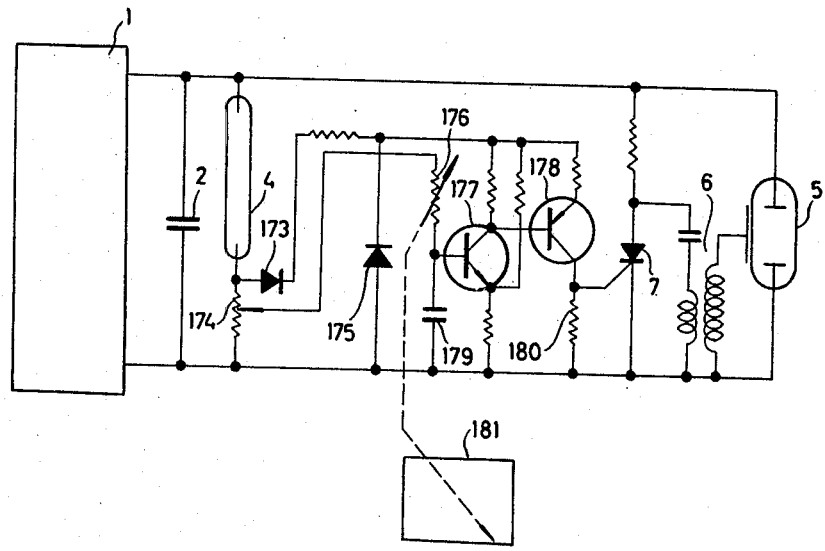
FIG. 26 shows a circuit diagram of a fourteenth embodiment of the photographing system according to the present invention.
Figure 27:
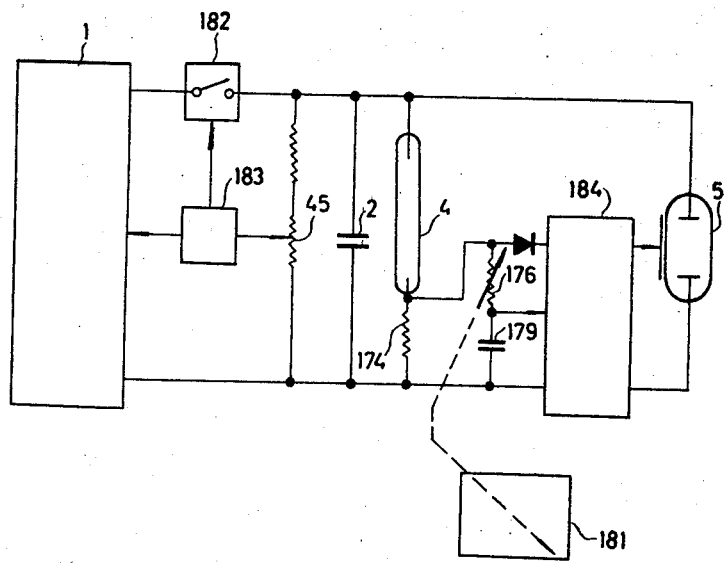
FIG. 27 shows a circuit diagram of a fifteenth embodiment of the photographing system according to the present invention.

The fourteenth embodiment shown in FIG. 26, and the fifteenth embodiment shown in FIG. 27 are respectively speed light devices in which a resistor 174 of low resistance is connected in series with the discharge tube 4 of dielectrodes and the charged voltage across the main capacitor 2 is automatically compensated by detecting the current through the resistor 174 of resistance value of several ten mili-ohms. 5 is a by-pass tube, 6 is a trigger circuit, 7 is a thyristor, 173 is a diode, 175 is a diode which functions as a voltage regulator, 176 is a variable resistor associated with a photographing information setting mechanism 181 of a camera, 179 is a timer condensor, 177 and 178 are transistors of a switching circuit, and 180 is its out-put load resistor back electromotive voltage proportional to the charge across the main capacitor 2 is obtained at the terminals of the resistor 174 by the discharge current therethrough, and is given to the switching circuit through the diode 173, a resistor and a diode 175. While the diode 175 stabilizes the voltage of the switching circuit, the back electromotive voltage in the resistor 174 charges the condensor 179 directly through the variable resistor 177. The current variation through the resistor 174 to the time variation is similar to that shown in FIG. 1-B.

In case when the charge across the main capacitor 2 is smaller than a pre-determined value, the amount of light, correspondingly the current through the resistor 174 becomes smaller to delay the operation of the timer.

While in case when the charge across the main capacitor 2 is larger than a pre-determined value, the amount of light, correspondingly the current through the resistor 174 becomes larger to quicken the operation of the timer.

The fifteenth embodiment shown in FIG. 27 is similar to the fourteenth embodiment shown in FIG. 26 except for the provision of a control circuit 183 for switching on or off a switching means of semi-conductor 182 to attain a controlled varial voltage across the main capacitor 2. 184 shows a circuit for timer action and trigger action.

Figure 28:
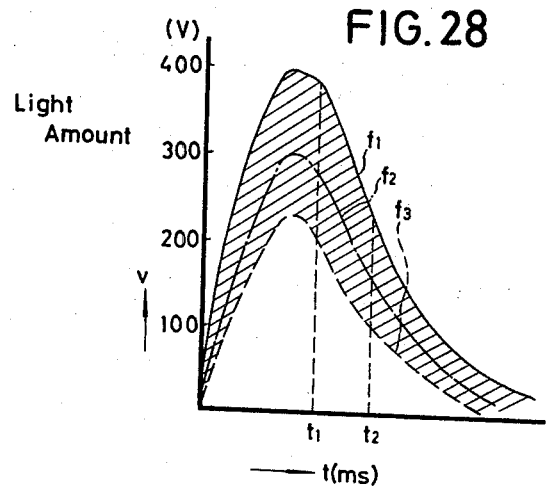
FIG. 28 is a graph showing the relation between the voltage across a main capacitor and the time in case of the fifteenth embodiment.
Figure 29:
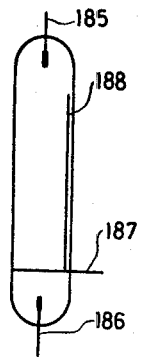
FIGS. 29 and 30 are conventional discharge tubes of di-electrode type.
Figure 30:
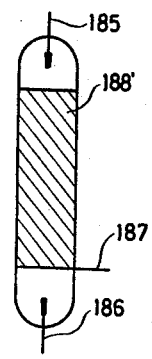

FIG. 28 shows the variation of the back electromotive voltage of the resistor to the time variation, in which the variation curve $f_1$ is for adjustment of a high guide number value while curves $f_2$ and $f_3$ are for adjustment of lowered guide numbers with the aid of the switching means 182 the control circuit 183 and the variable resistor 45.

The total light amount for the curve $f_3$ is equal to the light amount for the curve $f_2$ until the time $t_2$ and is equal to the light amount for the curve $f_1$ till the time $t_1$ as shown in FIG. 28.

The discharge tubes shown in FIGS. 29 to 33 will be described in details.

In general, to increase the light amount illuminated from a discharge tube, it is necessary to enhance the gas pressure in the tube. However, the ignition voltage of the discharge tube must be increased for the gas pressure increase. Therefore, in case of the tubes shown in FIGS. 29 and 30, it is not possible to control the supplied voltage thereto under a value equal to ½ of the maximum supplied voltage.

In order to overcome this defect, the discharge tube is provided with a third auxiliary electrode for illumination excitation.

Even in case of a discharge tube with the third auxiliary electrode, it is still impossible to attain normal illumination excitation due to the discharge between the electrodes of the same polarity in such a case where the voltage difference between the electrodes of the same polarity is several hundred volts. The tubes shown in FIGS. 31 to 33 overcome this defect by positioning a triggering electrode at a position as shown in the figures which is determined through experiments.

Figure 31:
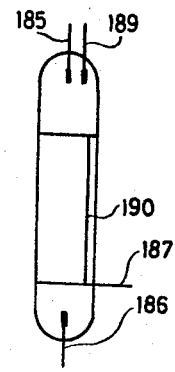
FIG. 31 to FIG. 33 are discharge tubes of tri-electrode type according to the present invention.
Figure 32:
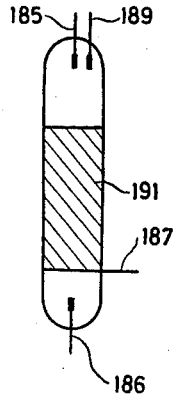
Figure 33:
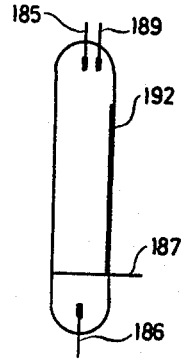

In FIGS. 29 to 33, 185 is an anode, 186 is a cathode, 187 is a trigger band, 188 is a trigger electrode, 188' is a trigger electrode coated with nesa-glass, 189 is an auxiliary electrode, 190, 191 and 192 are trigger electrodes positioned apart from the respective electrodes to permit illumination excitation between the cathode 186 and the auxiliary electrode 189. It is effective to position the trigger electrode close to the cathode as shown FIGS. 31 and 32 or to arrange the trigger electrode in a straight line almost parallel to the discharge current path as shown in FIG. 31 and FIG. 33.

The sixteenth embodiment shown in FIGS. 34 and 35 refers also to a speed light device which is lighted to irradiate a certain predetermined light amount especially, making use of a photoflash triode equipped with an auxiliary electrode.

It is necessary to make the guide number of a speed light device variable in order to take photographs with a certain determined diaphragm value at any shooting distance in case of flash photography.

There are two ways to vary the guide number of speed light, that is to say, by changing over the electrostatic capacity of the main capacitor or changing charging voltage in order to change the charge to be loaded, whereby in the latter case with the device equipped with conventional photoflash discharge tube the variable range is disadvantageously considerably limited, because it is impossible to lower the charging voltage too much due to the characteristics of the conventional photoflash discharge tube.

The present sixteenth embodiment refers to an improvement of speed light device whose guide number is varied by changing the charging voltage of the main capacitor as mentioned above, whereby the device is provided with a photoflash discharge tube having an auxiliary electrode, an auxiliary capacitor to supply an ignition power of high voltage always higher than voltage capable of letting the discharge tube without the auxiliary capacitor discharge and a high voltage power source to charge the above auxiliary capacitor. Namely the speed light device presents a main capacitor and an auxiliary capacitor which are charged either with a low voltage DC power source or AC power source, whereby the charging circuit of the main capacitor can be pre-set and controlled with a guide number selecting mechanism, while the charging circuit of the auxiliary capacitor is always supplied with a certain determined high voltage, and further presents a photoflash discharge diode equipped with an indicating circuit functionally connected with the above guide number selecting mechanism.

Below the present sixteenth embodiment is explained in detail according to FIGS. 34 and 35. FIG. 34 is a block circuit diagram of the disposition of a speed light device and a photographing system. In FIG. 34, 193 is an AC. source, 194 a DC. source such as DC. step-up circuit, 195 a detector circuit for the terminal voltage across a main capacitor 196, 197 a photoflash discharge triode tube with its trigger circuit, 185 the main electrode, 190 the auxiliary electrode, 198 an auxiliary capacitor, 199 a DC. step-up circuit to charge the auxiliary capacitor 198, and 200 an indicating circuit of the guide number.

The operation is as follows. In case the AC. source is used, the auxiliary capacitor 198 is directly charged with the AC. through a rectifier 220, while the main capacitor 196 is charged up to a voltage corresponding to a pre-set guide number, by controlling the switching circuit for the charge of the AC. source with the out-put of the detecting circuit 195 for the terminal voltage of the main capacitor 196. The voltage across the main capacitor 196 respectively of the auxiliary capacitor 198 is given to the main electrode 185 respectively the auxiliary electrode 190 of the photoflash discharge tube 197, whereby the photoflash discharge tube 197 is lighted with the trigger signal coming from its trigger circuit. In the photoflash discharge tube 197 at first between the auxiliary electrode 190 and the cathode 186 the discharge takes place by means of the high voltage of the charge loaded in the auxiliary capacitor 198, and then the charge loaded in the main capacitor 196 is discharged in such a manner that the lighting takes place according to the preset guide number, whereby the guide number is known in advance by means of a meter of the light amount indicating circuit 200 functionally connected with the guide-number setting mechanism.

FIG. 35 is a circuit construction of the sixteenth embodiment, whereby the parts 193 to 200 correspond to those of FIG. 34. 201 is an in-put terminal, 202 is a thyristor acting as a switch, 203, 204 and 205 respectively a resistor, condenser and diactive element DIAC. composing a pulse generator, with which out-put the thyristor 202 is biased. 206 and 207 are switching transistors to switch on or off the pulse generator, and act according to the operation of the voltage regulator tube or a neon lamp 29 of the detecting circuit 195. The AC. source 193 consists of the parts 201 to 207. 208 is a battery as a DC. source. 209 is a transistor for oscillation, 210, 211 and 212 are transistors for controlling the oscillator, whereby 211 and 212 act according to the operation of the neon lamp 29. The DC. source 194 consists of the parts 209 – 212, with current supply from the battery 208.

In case of operation by the AC. source, at first the source switch not shown in the drawing, is operated. The thyristor 202 is turned on with the pulse generating circuit of parts 203, 204 and 205, the main capacitor 196 is charged through the rectifier 220, whereby the terminal voltage is detected with the detecting circuit 195 which is pre-set in advance and as soon as the voltage reaches a certain determined value, the neon lamp 29 lights up. When the neon lamp lights up, the transistors 206 and 207 are switched on and the condensor 204 of the pulse generating circuit is short-circuited, so that the pulses generated by the diactive element DIAC 205 cease and the thyristor 202 is switched off. In this way the terminal voltage of the main capacitor 196 is kept constant so as to correspond to the desired guide-number, pre-selected by the switch SW of the detecting circuit 195. On the other hand the auxiliary capacitor 190 is directly charged from the AC. source through the rectifier 220 up to a voltage always high enough to let the photoflash discharge tube light up. When the trigger circuit 214 of the photoflash discharge tube 197 is acted by closing the contact 215 for synchronous lightening in the above-mentioned state, the charge in the auxiliary capacitor 198 is at first discharged by means of the auxiliary electrode 190, inducing the photoflash discharge tube 197 to light up, and then the charge in the main capacitor 196 is discharged through the main electrode 185 in such a manner that the lightening corresponds to the pre-set guide number. When the neon lamp 29 lights up due to the switch SW functionally connected with the guide number setting mechanism 213 of the detecting circuit 195, the transistor 218 is switched on and the pointer of the meter 24 of the indication circuit 200 shows the guide number of the device. As in this circuit the variable resistor 38 is functionally connected with the shooting distance ring of a camera, the diaphragm value corresponding to the distance is automatically obtained.

In case the DC. source is used, the oscillation circuit consisting of the transistor 209 is put in operation and its out-put, being rectified, charges the main capacitor 196, while the out-put of the oscillation circuit consisting of the transistor 216 is rectified so as to charge the auxiliary capacitor 198. When in this case the neon lamp 29 lights up at the voltage pre-set by means of the terminal voltage detecting circuit 195 of the main capacitor 196, the transistors 211 and 212 of the switching circuit is switched-on and then the transistor 210 is switched-on so as to cease the oscillation, so that the charging of the main capacitor 196 is stopped and the voltage across the main capacitor is kept at a certain determined value. The operation after that is same as the case with the AC. source, and the photoflash discharge tube 197 lights up corresponding to the desired guide number.

As mentioned above the sixteenth embodiment shown in FIGS. 34 and 35 lights up with sure either with an AC. source or with a DC. source at a certain guide number value variable in a wide range, whereby the electric source for charging the main capacitor and that for charging the auxiliary capacitor are provided independently from each other and with both of them the photoflash discharge triode is effectively lighted up so that this embodiment offers a very effective speed light device which can enjoy a very wide range of application.

What is claimed is:

1. A flash device for a camera, comprising an illuminator for irradiating light, a controller coupled to said illuminator for controlling the quantity of light irradiated by said illuminator as time integration of a light intensity, and operator adjustable means in said controller for varying the operation of said controller on the basis of the distance between the camera and the scene being illuminated.

2. A flash device for a camera according to claim 1 which further comprises a guide number operator.

3. A flash device for a camera according to claim 1 which further comprises a flash operator for flash photographing.

4. A flash device for a camera according to claim 1 in which the controller comprises a main capacitor for voltage supplied to the illuminator.

5. A flash device for a camera according to claim 1 in which the artificial illuminator comprises a discharge tube of dielectrode type.

6. A flash device for a camera according to claim 5 in which the controller comprises a quenching tube.

7. A flash device for a camera according to claim 6 in which the quenching tube is terminated by a timer.

8. A flash device for a camera according to claim 7 in which the timer has variable time constant corresponding to at least an illumination distance.

9. A flash device for a camera according to claim 7 in which the timer compensates the variation of supplied voltage to the discharge tube.

10. A flash device for a camera according to claim 1 in which the controller controls supplied voltage to the illuminator.

11. A flash device for a camera according to claim 1 in which the controller comprises at least a part of a detector of the supplied voltage to the illuminator.

12. A flash device for a camera according to claim 7 in which the timer starts with an illumination signal of the discharge tube.

13. A flash device for a camera according to claim 10 in which the controller comprises a means for enhancement of the supplied voltage.

14. A flash device for a camera according to claim 10 in which the controller comprises a means for reduction of the supplied voltage.

15. A flash device for a camera according to claim 3 in which the flash operator comprises a flash exposure calculator and the flash operator is adjusted by the calculated value of the calculator.

16. A flash device for a camera according to claim 6 in which the discharge tube and the quenching tube are simultaneously triggered by a trigger circuit.

17. A flash device for a camera according to claim 4 in which the controller further comprises a secondary capacitor.

18. A flash device for a camera according to claim 1 in which the illuminator comprises a discharge tube of trielectrodes.

19. A flash device for a camera according to claim 18 in which the discharge tube is provided both with a main capacitor and an auxiliary capacitor.

20. A flash device for a camera according to claim 19 in which the supplied voltage to the main capacitor is controllable.

21. A flash device for a camera according to claim 20 in which the controller further comprises a detector circuit for the control of the supplied voltage to the main capacitor.

22. A flash device for a camera according to claim 21 in which the detector circuit comprises a means for discharging an excessive charge across the main capacitor.

23. A flash device for a camera according to claim 20 in which the main capacitor is charged stepwise from a secondary with the aid of a switching means.

24. A flash device for a camera according to claim 3 in which the switching means is synchronized with the trigger circuit of the discharge tube.

25. A flash device for a camera according to claim 24 in which the trigger circuit is triggered by a starter of oscillator construction.

26. A flash device for a camera according to claim 11 in which the detector comprises an indicating means such as an ammeter.

27. A flash device for a camera according to claim 26 which further comprises a flash exposure calculator which controls the light amount from the discharge tube.

28. A flash device for a camera according to claim 10 in which the controller comprises a semi-conductor such as a transistor and a silicon controlled rectifier.

29. A flash device for a camera according to claim 5 in which the controller comprises a main capacitor and a sub-capacitor for intermmittent successive illumination.

30. A flash device for a camera according to claim 18 which further comprises different power sources which are switched over from one to the other by a switching means.

31. A flash device for a camera according to claim 18 in which controller further comprises a by-pass tube.

32. A flash device for a camera according to claim 7 in which a resistor is connected in series with the discharge tube and the time constant of the timer is compensated for the variation of supplied voltage to the main capacitor.

33. A flash device for a camera according to claim 32 which further comprises a stoppage means of power supply to the main capacitor, 34. A flash device for a camera according to claim 18 in which the discharge tube has its trigger electrode close to its cathode.

35. A flash device for a camera according to claim 18 in which the discharge tube has its trigger electrode arranged in a straight line almost parallel to the discharge current path.

36. A photographic system for operating an artificial illuminator, comprising a controller coupled to said illuminator for controlling the quantity of light irradiated by the illuminator as a time integration of the time intensity, and operator adjustable means in said controller for varying the operation of said controller on the basis of the distance between the camera and the scene being illuminated.

37. A photographing system according to claim 36 which further comprises a guide number operator.

38. A photographing system according to claim 36 which further comprises a flash operator for flash photographing.

39. A photographing system according to claim 36 which further comprises a photometric circuit for automatic flash exposure control.

40. A photographing system according to claim 36 which further comprises a photometric circuit for EE operation.

41. A photographing system according to claim 36 which comprises a reference pointer for diaphragm value.

42. A photographing system according to claim 41 in which the reference pointer is pre-set by adjustment of a diaphragm ring.

43. A photographing system according to claim 36 in which the controller comprises a detector of supplied voltage to the illuminators.

44. A photographing system according to claim 43 in which the detector comprises an indicating means such as an ammeter.

45. A photographing system according to claim 38 in which the flash operator comprises a flash exposure calculator and the flash operator is adjusted by the calculated value of the calculator.

46. A photographing system according to claim 38 in which the illuminator is triggered by a synchronous starter.

47. A photographing system according to claim 36 in which the illuminator comprises a discharge tube of tri-electrode type.

48. A photographing system according to claim 36 in which the controller comprises a main capacitor and a sub-capacitor for intermittent successive illumination.

49. A photographing system according to claim 36 in which the controller comprises a main capacitor and an auxiliary capacitor.

50. A photographing system according to claim 49 which further comprises a stoppage means of power supply to the main capacitor.

51. A photographing system according to claim 50 in which the operator is provided in a camera unit.

52. A photographing system according to claim 36 in which the system is composed of three units of a camera unit, a flash unit and an adapter unit.

53. A speed light control device for automatic light emission control of a photoflash discharge tube, comprising a main capacitor, means for discharging said main capacitor through said photoflash discharge tube, a controller including a by-pass discharge tube for bypassing current intended to flow through said photoflash discharge tube so as to end illumination of said photoflash discharge tube before said photoflash discharge tube has discharged the current from said main capacitor, means in said controller for presetting photographic information, a feedback circuit in said controller to adjust the time before said by-pass discharge tube ends illumination of said photoflash discharge tube, and means in said controller for responding to the voltage across said main capacitor to adjust the time before said by-pass discharge tube ends illumination by said photoflash discharge tube.

54. A speedlight device, comprising a main capacitor, means for charging said main capacitor, a photoflash discharge tube, means for discharging said capacitor through said photoflash discharge tube, said photoflash discharge tube having an auxiliary electrode, an auxiliary capacitor, means for discharging said auxiliary capacitor, means for applying the charge across said auxiliary capacitor across said auxiliary electrode so as to render said photoflash discharge tube ready to light up, and a detecting circuit connected to said means for discharging said main capacitor and including a neon discharge lamp and a photoelectric element for controlling the charging voltage of said main capacitor.

55. Speed light device with variable light amount according to claim 54, characterized therein that parallel to the main capacitor a discharge circuit is provided which can be controlled by the out-put of the detecting circuit of the terminal voltage of the main capacitor.

56. Speed light device with variable light quantity according to claim 54, characterized therein that in functional connection with the setting device of photographic informations in the exposure meter circuit of camera the charging voltage of the main capacitor of the speed light device is controlled.

57. A speedlight device with a variable light output, comprising a main capacitor, a first electric source for charging said main capacitor, an auxiliary capacitor, a second electric source for charging said auxiliary capacitor, a photoflash discharge tube, an adjustable guide number setting mechanism, said main capacitor being charged to a predetermined voltage on the basis of the adjustment of said guide number setting mechanism, said auxiliary capacitor being charged to a given voltage high enough to permit said photoflash discharge tube to ignite, said main capacitor being connected to said photoflash discharge tube to discharge across said photoflash discharge tube and said auxiliary capacitor being connected to said auxiliary electrode to induce said photoflash discharge tube to ignite, said first electric source having a charging voltage controlling device.

58. Speed light device with variable light amount according to the claim 57, characterized therein that the indication circuit is switched over in association with the guide number setting mechanism, whereby the indication of the meter shows the guide number as well as the readiness for the photoflash operation.

* * * * *